United States Patent
Forrest

[11] 3,880,648
[45] Apr. 29, 1975

[54] METHOD FOR PRODUCING STEEL IN AN ELECTRIC ARC FURNACE

[75] Inventor: Alexander C. Forrest, Inglewood, Calif.

[73] Assignee: Bethlehem Steel Corporation, Bethlehem, Pa.

[22] Filed: June 27, 1973

[21] Appl. No.: 374,150

[52] U.S. Cl. .......................... 75/13; 75/46; 266/33
[51] Int. Cl. .......................................... C21c 5/52
[58] Field of Search ........ 75/11, 12, 13, 46; 266/13, 266/33 S; 13/9

[56] References Cited
UNITED STATES PATENTS

| | | | |
|---|---|---|---|
| 3,290,031 | 12/1966 | Maatsch et al. | 75/12 X |
| 3,612,740 | 10/1971 | Gierck et al. | 75/13 UX |
| 3,669,436 | 6/1972 | Kemmetmueller | 266/33 S |

Primary Examiner—L. Dewayne Rutledge
Assistant Examiner—M. J. Andrews
Attorney, Agent, or Firm—Joseph J. O'Keefe; Charles A. Wilkinson; John S. Simitz

[57] ABSTRACT

A method for producing steel in an electric arc furnace to increase its productivity and overall efficiency, which method utilizes apparatus comprising two roofs and a preheater station. One roof is equipped with fuel burners and the second roof is a conventional electric arc furnace roof provided with a plurality of ports through which carbon or graphite electrodes can be lowered into the electric arc furnace. The furnace can be connected to the preheater station to preheat scrap steel and iron contained in a charging bucket in the preheater station.

In the method of the invention, a portion of the total charge of scrap steel and iron is melted in the electric arc furnace by electric power. A second portion of the total charge of scrap steel and iron is placed in a conventional clamshell-type charging bucket and is positioned in a preheater station alongside the electric arc furnace. The second portion of scrap steel and iron is preheated by the hot gases formed in the electric arc furnace. The hot gases pass from the electric arc furnace to the preheater station through interconnected waste gas ducts atop the roofs. The hot gases pass downwardly through the scrap to heat the scrap to a temperature between 800° F. and 1,200° F. and pass outwardly to the exhaust system by means of ductwork connecting the bottom of the clamshell-type charging bucket to an air pollution control unit. The second portion of the charge of scrap steel and iron is charged into the furnace and a third portion of the total charge of scrap steel and iron is charged into a clamshell-type charging bucket and placed in the preheater station. The third portion of the charge of scrap steel and iron is preheated by the hot gases formed in the electric arc furnace during melting of the second portion of the charge of scrap steel and iron. The process is repeated until the melting capacity of the electric furnace is achieved. The initial scrap steel and iron charge for the next heat of steel to be produced in the campaign is preheated in the preheater station during the refining of the steel in the electric furnace. The preheated scrap remains hot during tapping of the preceding heat and furnace inspection and repair to the refractory lining in the electric furnace. if desired, however, the scrap may be additionally heated by means of the fuel burners in the preheater roof. The initial cold charge of scrap for the first heat in a campaign or series of heats is preferably preheated in the furnace shell using the preheater roof.

4 Claims, 4 Drawing Figures

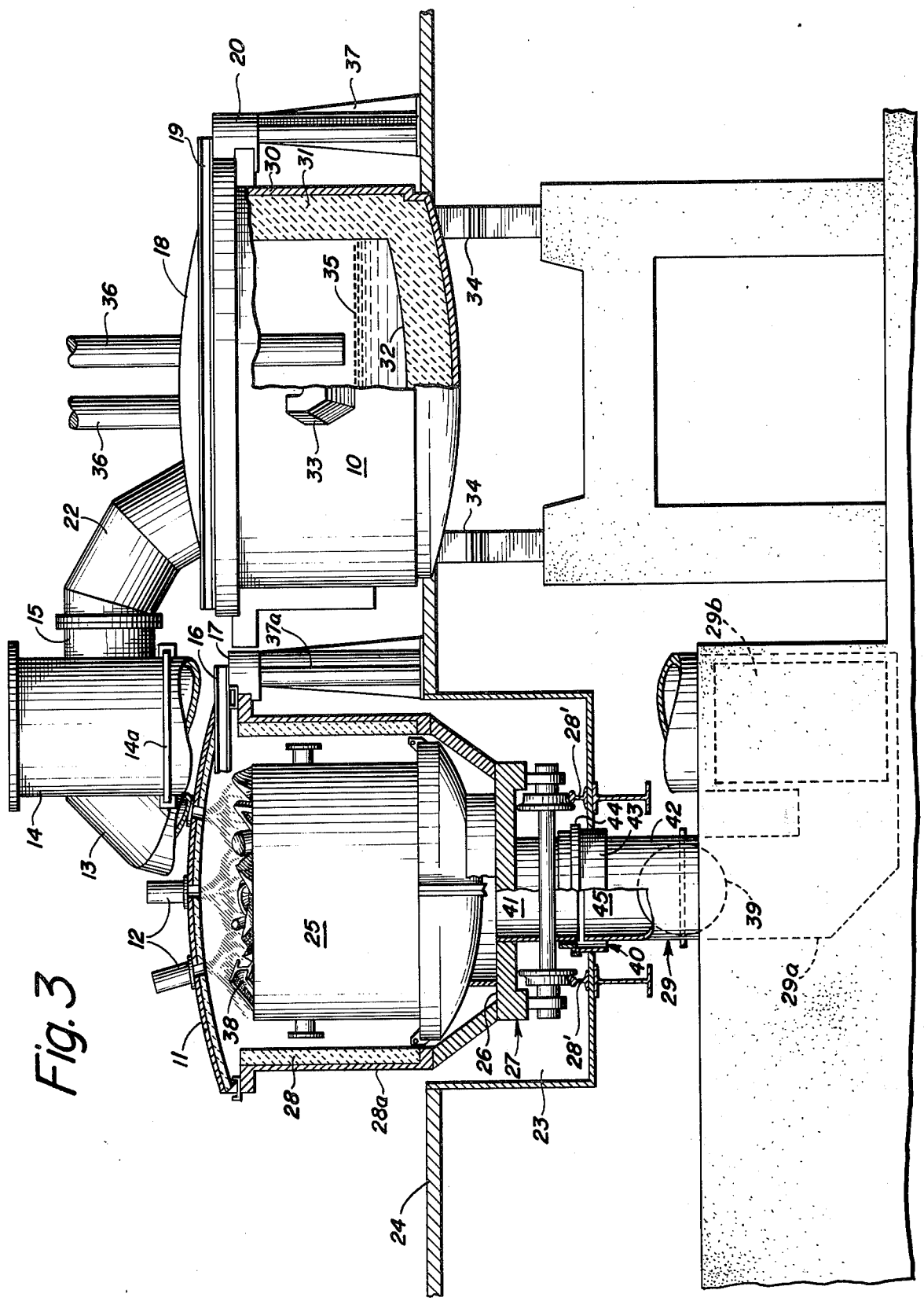

METHOD FOR PRODUCING STEEL IN AN ELECTRIC ARC FURNACE

BACKGROUND OF THE INVENTION

It is well known to those skilled in the art of steelmaking that production costs in producing steel in an electric arc furnace are generally higher than the costs of producing steel in a basic oxygen furnace or open-hearth furnace. Usually all of the scrap steel and iron required to produce a "heat" of steel cannot be charged into an electric furnace at one time, thereby necessitating interruption of the process to make two and three charges of scrap steel and iron to the furnace. The amount of electric power required to melt the cold charges of scrap steel and iron, the intermittent operation of the furnace and the time required to charge all of the scrap steel and iron into the furnace increase the production costs of the electric arc furnace steelmaking process.

Modern trends in the industry have been toward the preheating of the charge of cold scrap steel and iron before it is charged into the furnace. One method of preheating the scrap steel and iron is described in U.S. Pat. No. 3,514,279 issued May 26, 1970 to R. F. Jensen et al. entitled "Preheating Scrap With Controlled Oxidation" wherein cold scrap steel and iron is preheated by hot combustion gases, formed by burning fossil fuel, which pass downwardly through the scrap steel and iron in a refractory lined charging bucket. Unfortunately, overheating and uneven heating of the scrap steel and iron occurs in the charging bucket in the Jensen process, resulting in melting and fusion of the scrap steel and iron, making it extremely difficult, if not impossible, to remove the scrap steel and iron from the charging bucket and/or to charge or use the preheated scrap steel and iron in the electric furnace.

Several methods have been devised to preheat scrap steel and iron by passing waste gases formed in an electric furnace downwardly through the scrap steel and iron in a charging bucket. These methods are exemplified in U.S. Pat. No. 3,565,407 issued Feb. 23, 1971 to Kurt Schermer et al. The Schermer et al. method requires the installation of a combustion chamber, a special holder for the charging bucket and extensive ductwork connecting the electric furnace to the combustion chamber, charging bucket and exhaust stack. The installation costs are high and the equipment too bulky to install in existing plants.

Still other methods of heating scrap have been devised in which a dual set of electric furnace bodies and a dual set of roof are employed to obtain a substantially continuous process of steelmaking. Two of these methods and apparatus are shown in U.S. Pat. No. 3,612,739 issued Oct. 12, 1971 to Simon M. Korneff entitled "Dual Electric Furnace Facility" and U.S. Pat. No. 3,379,815 issued Apr. 23, 1968 to W. B. Parker and entitled "Electric Arc Furnace Having Two Hearths and Interchangeable Roofs Therefor." The apparatus in both cases is expensive, requires two electric furnace bodies and two interchangeable roofs and mechanism to suspend and move the roofs and also requires large shop areas which are generally not available in existing shops. The mechanism for the manipulation of the roofs during furnace operations is complex as is also the manipulation of the roofs.

It is therefore the object of this invention to provide a method for producing steel in an electric arc furnace wherein the productivity and the overall efficiency of the electric arc furnace is improved.

It is another object of this invention to provide a method for producing steel in an electric arc furnace which method uses fuels other than electric power for preheating portions of the cold charge of scrap steel and iron and is therefore not wasteful of electric energy and results in increased productivity and overall efficiency of the electric furnace.

It is a further object of this invention to provide a method for producing steel, which method utilizes an electric arc furnace having two roofs, one of which is equipped with burners and the other of which is a conventional electric arc furnace removable roof and a preheater station.

It is a still further object of this invention to provide a method for producing steel in an electric arc furnace wherein hot gases from the electric arc furnace are used to preheat at least a portion of the scrap steel and iron to be charged therein.

DESCRIPTION OF THE DRAWINGS

FIG. 3 is a partially sectioned view in elevation of the apparatus used in the method of the invention.

DESCRIPTION OF THE PREFERRED EMBODIMENT

As previously stated, it is generally not possible to charge the entire amount of the scrap steel and iron required to produce a "heat" of steel at one time into an electric arc furnace. Therefore, the total amount of scrap steel and iron required for a "heat" is divided into several substantially equal charges. Generally the scrap steel and iron is divided into three charges. In the method of the invention, the first charge of scrap steel and iron in the first "heat" of a campaign is charged into the electric arc furnace and is preheated in the electric arc furnace by means other than electric energy, for example, burning fossil fuel provided through fossil fuel burners. Thereafter, the required charges of scrap steel and iron are preheated by passing hot gases formed in the electric arc furnace downwardly through the scrap steel and iron charges contained in a charging bucket in a preheater station.

Figure 1:
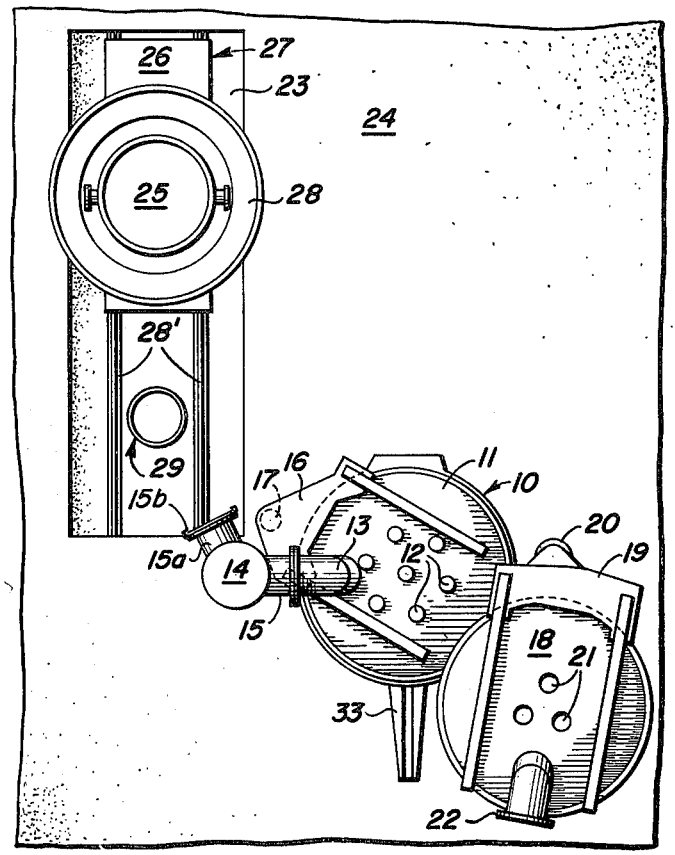
FIG. 1 is a top view of the apparatus used in the method of the invention wherein a first roof is in position atop the electric arc furnace.
Figure 2:
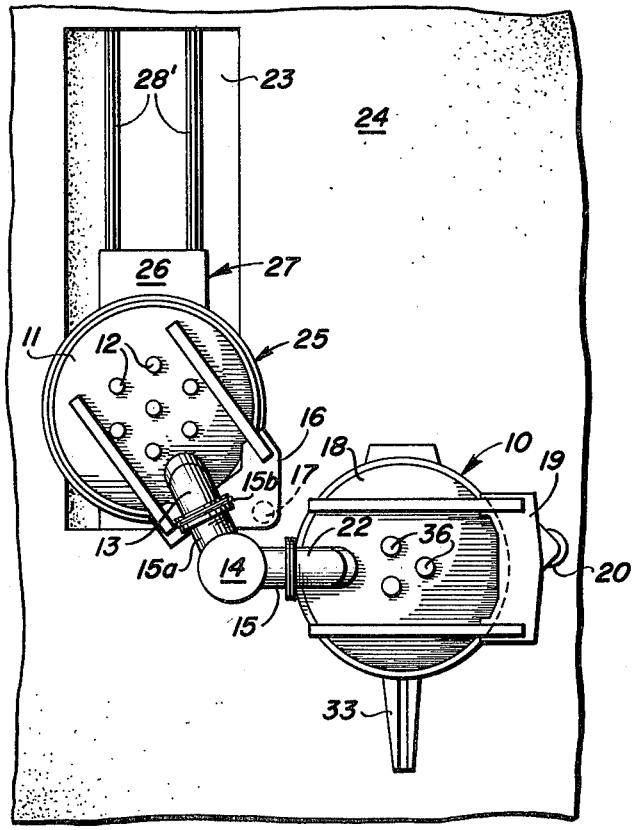
FIG. 2 is a top view of the apparatus used in the method of the invention wherein the first roof is in position atop a clamshell-type charging bucket in a preheater station and a second roof is in position atop the electric arc furnace.

The method of the invention can be carried out by using the apparatus shown in FIGS. 1, 2 and 3. FIG. 1 is a top view of the apparatus as it is used at the start of a campaign. There is shown a conventional electric arc furnace 10, hereinafter referred to as the furnace, covered by a furnace roof 11 having a plurality of burners 12 (see FIG. 3 for detail), which extend downwardly through the roof 11 into the furnace, and a waste gas duct 13 extending upwardly and outwardly from the roof 11 and connected to a duct 15 which is an extension of a flame trap 14. The flame trap 14 is also provided with a second extension 15a and a valve 15b at the extremity of the second extension 15a. The valve 15b can be of several types, for example, guillotine type and the like. The furnace roof 11 will hereinafter be referred to as the burner roof. The burner roof 11 is provided with a first roof support and suspension means 16 which is mounted on a first positioning or swing means 17. The furnace 10 is provided with a second roof which is a conventional electric arc furnace roof 18, hereinafter referred to as the electrode roof. The electrode roof 18 is provided with a second support and suspension means 19 mounted on a second positioning or swing means 20. A plurality of ports or apertures 21 are provided in the electrode roof 18 through which standard carbon electrodes (not shown) can be lowered into the furnace 10 when the electrode roof 18 is in position atop the furnace 10. A waste gas duct 22 extends upwardly and outwardly from the electrode roof 18.

Referring now to FIG. 3, which is a partially sectioned view in elevation of the apparatus used to practice the method of the invention during a campaign, the furnace 10 has a cylindrical vertical steel shell 30 lined with refractory shapes 31 (shown in cross section) which can be made of any refractory material such as silica, alumina, lime, dolomite, magnesia and the like dependent upon whether an acid or basic practice is followed, a dished hearth 32 and a pouring spout 33 (only part of which is shown). The furnace 10 is mounted on trunnions 34 which are movable in tracks (not shown) whereby the furnace 10 can be tilted for tapping molten refined steel from the furnace 10. A molten steel bath 35 is shown in the furnace 10. The electrode roof 18 is shown in position atop the furnace 10. The carbon (graphite) electrodes 36 are shown extending downwardly into the furnace 10 through the ports 21 (not seen in FIG. 3, see FIG. 1) in the electrode roof 18. Electric power is applied to the contents of the furnace 10 by means of the electrodes 36 to melt the scrap steel and iron and refine the steel in the furnace. The electrodes 36 are connected to a suitable source (not shown) of electric power by connections at their upper extremities. Since the manner of connecting the electrodes 36 to the source of electric energy does not constitute any part of this invention, the upper extremities of the electrodes 36, the manner of connecting the source of electric power thereto and the source of electric power are not shown. The waste gas duct 22 is connected to duct 15 and hence to the flame trap 14. Flame trap 14 extends downwardly and is connected to ductwork 29 (shown in dotted outline). An aperture 29b is provided in the ductwork 29 to allow hot waste gases to be passed to an air pollution control unit (not shown) hereinafter referred to as the APC unit, and then to the atmosphere. The flame trap 14 is cooled by water sprays (not shown) which can be internal or external. The water sprays cool the flame trap 14 and also dissipate flaming gases from the furnace 10 before the gases pass to the APC unit through aperture 29b.

The positioning means 20 is rotatably mounted on a structural steel framework or pedestal 37 similar to pedestal 37a upon which positioning means 17 is rotatably mounted.

A transfer car well 23 is provided in the floor 24 of the electric furnace shop. A conventional clamshell-type charging bucket 25 filled with cold scrap steel and iron 38 supported on the floor 26 of a self-propelled transfer car 27 is shown in position in the preheater station. The transfer car 27 has a refractory lined wall 28 built upon a steel framework 28a extending upwardly from the floor 26 of the transfer car 27. The transfer car 27 is movable on tracks 28'. Exhaust ductwork 29, connectable to duct 41 in the bottom of the transfer car 27, is provided beneath the transfer car well 23 whereby spent hot waste gases can be passed through the aperture 29b to the APC unit and then to the atmosphere. The burner roof 11 is positioned atop the refractor lined wall 28 of the transfer car 27. Waste gas duct 13 is connected to the flame trap 14 by means of duct 15a (see FIG. 2 hereinafter described). The valve 15b is opened (see FIG. 2). The valve 14a which can be a simple slide valve in the flame trap 14 is closed. A damper 39 is shown in the open position. Hot gases formed in the electric furnace 10 as the preheated scrap therein is being melted, pass through the waste gas duct 22, duct 15, the upper portion of the flame trap 14, duct 15a, waste gas duct 13 and downwardly through the scrap steel and iron 38 in the charging bucket 25. The hot gases pass downwardly through a downwardly extending duct 41 attached to the bottom of the transfer car 27. A movable or retractable seal 40, slideably movable, is mounted on the duct 41. The moveable seal 40 is lowered to meet the upper duct 42 of ductwork 29 beneath the transfer car well 23. The upper extremity 43 of the retractable seal 40 is provided with a ring 44 which rests on the floor of the transfer car well 23 when the retractable seal 40 is lowered to thereby make an airtight seal with the upper extremity 45 of the duct 42. The duct 42 is connected via aperture 29b to the APC unit by means of ductwork 29. The damper 39 in ductwork 29 controls the flow of spent hot gases passing downwardly from the charging bucket 25 to the APC system.

Turning now to FIG. 2 which is also a top view of the apparatus of the invention as it is used to preheat all the scrap charges except the first scrap charge in a campaign, the burner roof 11 is in position atop the clamshell-type charging bucket 25 (see FIG. 3) on the transfer car 27 which is in position in a preheater station. The waste gas duct 13 is connected to the duct 15a. The valve 15b is open. The electrode roof 18 is shown in position atop the furnace 10. Waste gas duct 22 is connected to the duct 15.

In the method of the invention, at the start of a campaign, a first scrap steel and iron charge constituting about 40 to 50% of the total scrap steel and iron charge required to produce a heat of steel of a given analysis is charged cold into the furnace 10 through the open top of the furnace 10. A heat of steel is the amount of steel produced at one time in a furnace. The furnace can be rated as 25 ton, 50 ton, 100 ton, etc., which rating constitutes one heat of steel. The heat can be as little as 95 tons and as much as 107 tons for a furnace rated at 100 tons. A campaign is made up of many heats of steel and can be as many as 200 heats. The burner roof 11 is placed atop the furnace 10. Duct 13 is connected to duct 15 which in turn leads into the flame trap 14. Valve 14a in the flame trap 14 is opened and valve 15b is closed. The fuel flowing through the burners 12, which burners 12 can be fossil fuel burners, oxygen lances, fuel-oxygen burners and the like, is ignited and is used to preheat the scrap steel and iron within the furnace 10 to within a temperature range of about 900° F. to about 1,200° F. Hot gases formed in the furnace 10 during preheating pass to the atmosphere through ducts 13 and 15, flame trap 14, ductwork 29a and flue opening 29b which leads to the atmosphere or to an APC system or the like. Flame trap 14 is preferably kept cool during this operation as previously described by internal or external water sprays. Damper 39 in ductwork 29 is closed during this operation.

Figure 4:
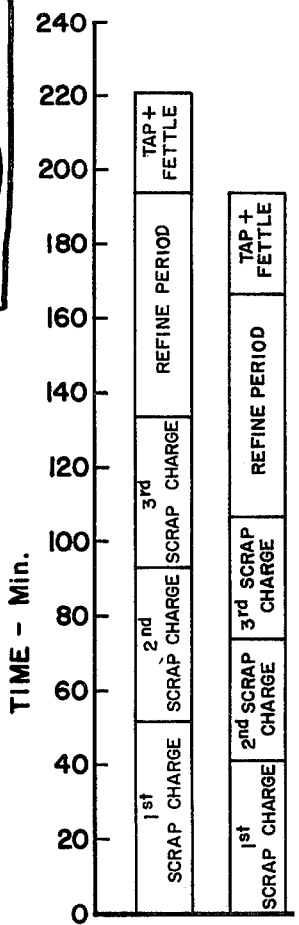
FIG. 4 is a bar graph comparing the time required to produce one "heat" of steel by prior art methods and the method of the invention.

While the scrap steel and iron in the electric arc furnace 10 is being preheated, a clamshell-type charging bucket 25 is filled with a second charge of scrap steel and iron 38 constituting about 29% of the total charge of scrap steel and iron and is positioned in place in the preheater station. The transfer car 27 is connected to the ductwork 29 as described previously. The burners 12 are turned off after the initial charge of metal is heated in the furnace 10. Duct 13 is disconnected from duct 15. The burner roof 11 is lifted from atop the furnace 10, swung horizontally, and is placed in position atop the refractory lined wall 28 of the transfer car 27 on which charging bucket 25 containing the second charge of scrap steel and iron 38 is positioned. Duct 13 is connected to duct 15a and valve 15b is opened. Valve 14a is closed. The electrode roof 18 is now placed atop the furnace 10 and carbon electrodes 36 are lowered into the furnace 10 through the ports 21 in the electrode roof 18. Duct 22 is connected to duct 15. Electric power at the highest voltage possible, usually about 450 volts, is turned on to melt the preheated scrap steel and iron in the shortest time possible. The connection of the duct 13 in the burner roof 11 to the duct 22 in the electrode roof 18 through the ducts 15, 15a and flame trap 14, the closure of valve 14a in the flame trap 14, and the opening of valve 15b in duct 15a and damper 39 allows the hot gases formed in the furnace 10 to pass from the furnace 10 through the ducts 22, 15, 15a and 13 to the preheater station and downwardly through the scrap steel and iron 38 in the clamshell-type charging bucket 25. The waste gases after passing through the scrap pass from the bottom of the charging bucket through damper 39, the ductwork 29 and aperture 29b to the APC unit (not shown). The scrap steel and iron 38 in the charging bucket 25 is preheated to a temperature of between 800° F. to 1,200° F. If required, fuel can be burned by the burners 12 in the burner roof 11 to further heat the hot waste gases and thereby aid in preheating the scrap steel and iron in the shortest time possible. When the scrap steel and iron in the charging bucket 25 reaches the desired temperature and after a pool of molten metal has been formed in the furnace 10, the ducts 22 and 15 and 13 and 15a are disconnected, valve 15b is closed, damper 39 is closed and valve 14a is closed and the roofs 11 and 18 are removed from atop the charging bucket 25 and furnace 10 respectively. The charging bucket 25 containing the preheated scrap steel and iron 38 is transported by crane (not shown) to the furnace 10 and the preheated scrap steel and iron 38 is charged into the furnace 10. A third charge of scrap steel and iron constituting about 20% of the total charge of scrap steel and iron in a second charging bucket (not shown) is next positioned in the preheater station to be preheated by the hot waste gases produced during melting and refining of preheated scrap steel and iron in the furnace. The electrode and burner roofs 18 and 11 respectively are then returned to their positions atop the furnace 10 and refractory lined wall 28 respectively and the above procedure repeated to allow hot gases to pass from the furnace 10 downwardly through the scrap steel and iron charge in the charging bucket 25. The foregoing steps are repeated as often as necessary to provide sufficient scrap to make the required amount of steel. The outlined steps are repeated to provide a substantially continuous process for manufacturing steel. A comparison of the above described method with a prior art method of producing a heat of steel in a 100 ton electric arc furnace is shown in FIG. 4.

The time required to charge and melt the first cold charge of scrap steel and iron in the method of the invention is about 41.2 minutes as compared to 51.5 minutes in the conventional method. The time required for charging and melting the second charge of scrap steel and iron is 33.2 minutes compared to 41.5 minutes by the conventional method and the time required to charge and melt the third charge of scrap steel and iron is 32.8 minutes compared to 41 minutes by the conventional method. It can be seen that the total time to produce 100 tons of steel by the method of the invention is about 193 minutes whereas to produce 100 tons of steel by conventional methods requires 220 minutes, or a saving of 27 minutes. This amounts to being able to produce approximately one extra heat of steel of 100 tons per day per furnace.

The electrical power is sequentially reduced in voltage during the melting and refining of the preheated scrap steel and iron in the furnace in the method of the invention. As a result, there is a savings in the total cost of the electrical power input to produce a heat of steel. In addition, the use of hot waste gases produced during the melting and refining steps in the furnace to preheat the scrap steel and iron reduces the amount of electrical power required to produce the steel, hence a considerable saving of electrical power or other fuel heretofore needed to preheat the scrap steel and iron is realized.

In a specific example of the method of the invention wherein a campaign is initiated and using the described apparatus, the first heat of steel in the campaign weighing about 100 tons is produced as follows. To produce 100 tons of steel in an electric arc furnace about 230,000 pounds of scrap steel and iron is required. Of course other raw materials, such as carbon, iron ore, and alloying elements, are also required and are charged into the electric furnace as needed.

The total charge of scrap steel and iron is divided into three separate charges, weighing roughly about 100,000 pounds, 80,000 pounds and 50,000 pounds. The 100,000 pounds of scrap steel and iron constituting about 44% of the total charge of scrap steel and iron are charged cold into the electric arc furnace through the top of the furnace. A first roof containing a plurality of fossil fuel burners and a waste gas duct is placed atop the electric arc furnace. The burners are designed to burn natural gas and other fossil fuels with air and/or oxygen injection. The fuel is ignited and the flames are directed downwardly onto the cold scrap steel and iron in the electric furnace. After about 41 minutes the scrap steel and iron has been heated to about 1,200° F. Some melting of the scrap steel and iron is observed. While the initial heating is taking place, a second charge of scrap steel and iron of about 80,000 pounds, which constitutes about 35% of the total charge of scrap steel and iron, is placed in a clam shell type charging bucket which rests on a transfer car.

The transfer car is then positioned in a preheater station which is adjacent to the electric furnace.

The burner roof is next moved upwardly off the furnace and is pivoted horizontally on its supporting mast from atop the furnace to atop the charging bucket and is lowered into position thereon. A second or electrode roof, which is equipped with a plurality of ports to allow carbon electrodes to be lowered through electrode roof is connected to the waste gas duct atop the burner roof and to the air pollution control unit. The carbon electrodes are lowered into the furnace and a maximum voltage of 450 volts of electric energy is applied to the electrodes. As the heating and melting of the scrap steel and iron in the electric furnace proceeds, hot waste gases having a temperature as high as 3,000° F. are produced. The hot waste gases pass through the connected ducts to the scrap steel and iron in the charging bucket in the preheater station. The hot waste gases pass downwardly through the scrap steel and iron to preheat the scrap to a temperature of about 1,200° F.

The spent waste gases which have passed downwardly through the scrap steel and iron are passed out of the bottom of the charging bucket to an air pollution control unit connected to the bottom of the transfer car by ductwork. The passage of the spent waste gases is controlled by valves positioned just below the transfer car and at the juncture of the ductwork and the air pollution control unit. After about 33 minutes the burner roof is removed from atop the charging bucket. The electrodes are raised from the furnace and the electrode roof is removed from atop the furnace. The second charge of scrap steel and iron is removed from the preheat station and now charged into the furnace. The electrode roof is replaced atop the furnace and electrodes are lowered into the furnace and melting of the second scrap charge of steel and iron proceeds. A third charge of scrap steel and iron weighing 50,000 pounds, which constitutes about 22% of the total charge of scrap steel and iron, is placed in the charging bucket which is positioned in the preheater station. The procedure previously described to preheat the second scrap steel and iron charge is now used to preheat the third scrap charge. After about 33 minutes the third charge of scrap steel and iron is preheated to a temperature of about 1,200° F. and is charged into the furnace as previously described. The usual procedures for refining the steel in the furnace to produce steel of a required chemical analysis, for example charging carbon, alloying agents, fluxes, etc., in the furnace are now followed to finish the heat of steel. When the scrap steel and iron is completely melted to form a molten pool in the bottom of the furnace, the maximum voltage of 450 volts is reduced sequentially to between 110 volts and 140 volts during the refining steps.

While the first heat of steel is being refined, as described above, the initial scrap steel and iron charge of about 100,000 pounds required for the next heat of steel is placed in a charging bucket and is positioned in the preheater station. The burner roof is lowered onto the charging bucket and the scrap steel and iron is preheated to 1,200° F. by the hot gases produced during the refining period, which lasts about 60 minutes, in the furnace as described above. Of course, additional heat can be supplied to the scrap steel and iron in the charging bucket by fossil fuel burned in the fossil fuel burner. The refined steel is tapped into a ladle. Approximately 26 minutes is required for emptying the furnace, and fettling or preparing the furnace for the next heat.

After the first heat of steel in each campaign or series of heats has been made, the scrap for each heat made is preheated as described above except that the initial scrap charge for each heat is preheated in the preheater station during the refining period of the preceding heat rather than being preheated in the electric furnace itself. The preheated scrap from the charging bucket is then charged into the furnace and further heated in the furnace while a second portion of the furnace charge is preheated in the charging bucket. The same cycle of preheating, heating and refining is then repeated throughout the remainder of the heat, and thereafter from heat to heat as previously described, until an interruption in the campaign of heats in the furnace. Upon restarting after such an interruption the initial charge of metal could, of course, be preheated in the preheater station, but since the furnace cycle will be starting out cold, it will be found much more efficient, and preferable, for the initial portion of the metal charge for the first heat to be heated in the electric furnace itself initially by means of fossil fuel burners and continuing with electric arc heating. The second portion of the charge, meanwhile, can be prepared and then preheated in the charging bucket at the preheater station as soon as the electric arc cycle of heating begins.

I claim:

1. An improved method for producing steel in an electric arc furnace which is equipped with two roofs movably interchangeable thereon, a first roof being equipped with more than one burner adapted to burn a fuel and a waste gas duct connectable to a flame trap and a second roof being provided with a plurality of apertures whereby carbon electrodes can be lowered into said furnace to thereby provide electric power thereto and a waste gas duct connectable to said flame trap and a preheater station adjacent to the electric arc furnace wherein a plurality of clamshell-type charging buckets, each bucket containing a portion of the total scrap steel and iron required to produce a heat of steel, are positioned to receive said first roof, said method comprising:

a. charging a first portion of the total charge of scrap steel and iron required to produce a heat of steel into said furnace,
   b. placing said first roof atop said furnace and connecting said roof to said flame trap, a damper in said flame trap being opened,
   c. burning fuel in said burners for a time to heat said first portion of said total charge of scrap steel and iron to within a temperature range of about 900° F.–1,200° F.,
   d. thereafter disconnecting said first roof from said flame trap and removing said first roof from said furnace,
   e. placing said first roof atop a charging bucket containing a second portion of the scrap required to produce a heat of steel and connecting said first roof to said flame trap and simultaneously placing said second roof atop said furnace, lowering said carbon electrodes into said furnace through said apertures in said second roof and connecting said second roof to said flame trap and closing said damper in said flame trap to thereby form a continuous passage from said furnace to said charging bucket, said damper remaining in the closed position for subsequent operations.

f. melting said first portion of said total charge of scrap steel and iron in said furnace by electric power and heating said second portion of said total charge of scrap steel and iron in said charging bucket by passing the hot gases formed in said furnace through said waste ducts and downwardly through said second portion of said total charge of scrap steel and iron in said charging bucket to bring said scrap to within a temperature range of about 900° F.–1,200° F., g. thereafter disconnecting said second roof from said flame trap, removing said carbon electrodes and said second roof from said furnace and simultaneously disconnecting said first roof from said flame trap and removing said first roof from said charging bucket, h. charging said second portion of said total charge of scrap steel and iron into said furnace, i. placing said second roof atop said furnace and lowering said carbon electrodes into said furnace and reconnecting said second roof to said flame trap, while simultaneously placing said first roof atop a second charging bucket containing a third portion of said total charge of scrap steel and iron in said preheater station and reconnecting said first roof to said flame trap, j. melting said second portion of said total charge of scrap steel and iron by electric power in said furnace and preheating said third portion of said total charge of scrap steel and iron in said second charging bucket to within a temperature range of about 900° F.–1,200° F. by passing hot combustion gases formed in said furnace through said waste ducts and downwardly through said third portion of said total charge of scrap steel and iron in said second charging bucket, k. thereafter disconnecting said second roof from said flame trap, removing said carbon electrodes and said second roof from said furnace and disconnecting said first roof from said flame trap and removing said first roof from said second charging bucket, l. charging said third portion of said total charge of scrap steel and iron into said furnace, m. replacing said second roof atop said furnace and lowering said carbon electrodes into said furnace, n. reconnecting said second roof to said flame trap and placing said first roof atop another charging bucket in said preheater station and reconnecting said first roof to said flame trap, said other charging bucket containing a first portion of the total charge of scrap steel and iron required to make an additional heat of steel in said furnace, o. melting said third portion of said total charge of scrap steel and iron and refining the molten bath in said furnace by electric power, p. preheating said first portion of said total charge of scrap steel and iron to within a temperature range of about 900° F.–1,200° F. by passing hot combustion gases formed in said furnace during said melting and refining periods through said waste ducts and downwardly through said first portion of said total charge of scrap steel and iron in said other charging bucket, q. thereafter disconnecting said second roof from said flame trap, r. removing said carbon electrodes and said second roof from said furnace, tapping said refined steel from said furnace, s. fettling said furnace and disconnecting said first roof from said charging bucket, and t. charging said first portion of said total charge of scrap steel and iron into said furnace and repeating at least the above steps (e) through (m) and (o) and (r) to thereby produce an additional heat of steel.

2. The method of claim 1 wherein the portions of said total charge of scrap steel and iron in said charging buckets in steps (f), (j), and (p) can be heated to within a temperature range of about 900° F.–1,200° F. by burning fossil fuel in the burners in said first roof atop said charging buckets.

3. The method of claim 1 wherein the temperature of the hot gases can be increased by burning fossil fuel in said burners in said first roof atop said charging buckets to thereby aid in raising the temperature of said portions of said total charge of scrap steel and iron to within a range of about 900° F.–1,200° F.

4. The method of claim 1 wherein steps (e) through (t) are repeated a plurality of times to make a plurality of succeeding heats of steel.

* * * * *